Patented Feb. 20, 1951

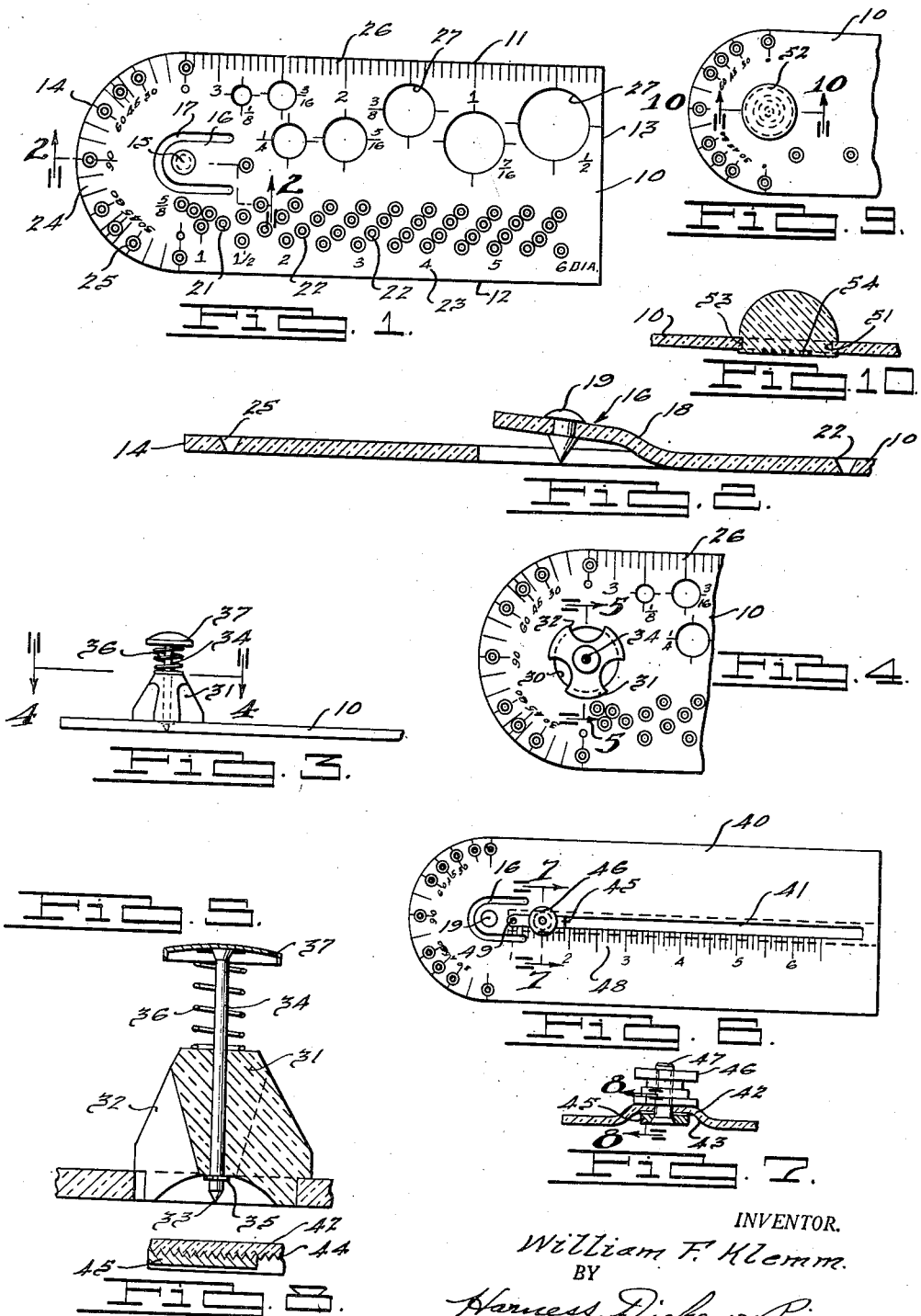

2,542,537

UNITED STATES PATENT OFFICE 2,542,537

PROTRACTOR COMPASS

William F. Klemm, Detroit, Mich.

Application October 4, 1945, Serial No. 620,354

1 Claim. (Cl. 33—27)

This invention relates to engineering scales and particularly to a scale for producing circles of any desired diameter.

The scale of the present invention may be made of any material but preferably is made of a transparent resin material of rectangular shape having one end of semicircular form. The center of the semicircular end is preferably disposed on a tab which is cut from the body of the sheet and formed to project thereabove. A centering pin is secured in the tab for engagement with a surface when the pin is pressed downwardly, which produces a center about which the scale may be revolved. The material is sufficiently flexible to permit the tab to deflect and return to its original position when released.

The scale is provided with rows of apertures in offset relation to each other approximately $\frac{1}{16}''$ apart so that circles varying $\frac{1}{8}''$ in diameter may be struck about the central pin. The pin being secured in the transparent material may be accurately located on the surface on which the circle is to be struck. Additional apertures of varying diameters are also provided through the body of the material for drawing circles of small diameter ranging from $\frac{1}{8}''$ to $\frac{1}{2}''$. Protractor divisions may be provided on the arcuate end of the scale and a linear scale may be provided along one edge thereof.

In a further form of the invention a spring-pressed pin may be mounted on a hub on the center of the semicircular end having cutaway portions forming an aperture through which the point of the pin is visible from the top scale. The point may be accurately located on the surface on which the circle is to be drawn irrespective of whether or not the material of the scale is transparent.

In a further form which the invention may assume, an elongated recess is provided in the lower face of the body portion for receiving a slide which is adjusted therein above the surface upon which the scale is located. Serrations may be provided on the under side of the recess and on the top of the slide for accurately positioning the slide in the recess. A bolt having a nut thereon projects through the slide and slot in the portion above the recess for securing the slide in adjusted position. The serrations are preferably disposed $\frac{1}{16}''$ apart so that the slide may be shifted to any one-sixteenth of an inch location quickly and accurately. An aperture in the slide for receiving the pencil point is located relative to the centering element through the adjustment of the slide. The circle may be struck about the centering element after the slide has been adjusted relative to the scale by placing the point of the pencil in the aperture in the slide and rotating the point about the centering element.

A semispherical element of transparent material having a center and concentric rings scribed on the plane face thereof may be employed as the centering element about which the scale may be revolved. In any of the constructions a scale is provided having a centering element which may be quickly located on a point about which a circle is to be struck. A circle of any desired diameter within the range of the scale may be drawn about a center through the application of the point of a pencil in an aperture located a predetermined distance from the centering element which will be equal to the radius of the circle described.

Accordingly, the main objects of the invention are: to provide a scale for drawing circles about a center having a projecting tab on which a center is located about which the scale may be revolved; to locate a plurality of rows of apertures in offset relation for receiving the point of a pencil and disposed in $\frac{1}{16}''$ increments from the center about which the scale is rotated; to provide a recess in the scale body having a slide containing an aperture therein which is adjustable relative to a centering element by which the radius of a circle is accurately located on the scale; to provide a magnifying centering element about which the scale may be revolved; and, in general, to provide a scale for drawing circles of any desired diameter within the scale range which is simple in construction, positive of operation and economical of manufacture.

Other objects and features of novelty of the invention will be specifically pointed out or will become apparent when referring, for a better understanding of the invention, to the following description taken in conjunction with the accompanying drawing, wherein:

Figure 1 is a plan view of an engineering scale embodying features of this invention;

Fig. 2 is an enlarged broken sectional view of the structure illustrated in Fig. 1, taken on the line 2—2 thereof;

Fig. 3 is a view of structure, similar to that illustrated in Fig. 2, showing a modified form of the invention;

Fig. 4 is a sectional view of the structure illustrated in Fig. 3, taken on the line 4—4 thereof;

Fig. 5 is an enlarged sectional view of the structure illustrated in Fig. 4, taken on the line 5—5 thereof;

Fig. 6 is a view of structure, similar to that illustrated in Fig. 1, showing a further form which the invention may assume;

Fig. 7 is an enlarged sectional view of the structure illustrated in Fig. 6, taken on the line 7—7 thereof;

Fig. 8 is an enlarged sectional view of the structure illustrated in Fig. 7, taken on the line 8—8 thereof;

Fig. 9 is a view of structure, similar to that illustrated in Fig. 1, showing a further form of the invention; and Fig. 10 is an enlarged sectional view of the structure illustrated in Fig. 9, taken on the line 10—10 thereof.

Referring to Figs. 1 and 2, a scale 10 is illustrated having parallel edges 11 and 12 joined at one end by a straight edge 13 and at the other end by a semicircular edge 14. The center of the semicircular edge is located at 15 on a tab 16 formed in the sheet of material by the U-shaped slot 17 cut therein. The sheet of material is preferably made of transparent material embodying a certain amount of resiliency. A tab 16 is reversely bent at 18 to project upwardly at an angle from the plane of the scale, as illustrated more specifically in Fig. 2. A centering pin 19 is mounted on the center 15 of the tab, the point of which is maintained substantially in the plane of the lower surface of the scale or slightly thereabove.

The transparency of the material of the tab 16, as well as the slot 17 thereabout, permits the point of the pin 19 to be accurately located on the point of a surface upon which a circle is to be struck. For locating the pencil point relative to the center 15, a plurality of apertures 21 are provided in rows 22 in oblique relation so as to be located in increments $\frac{1}{16}''$ apart relative to the center 15. A radius may be selected in $\frac{1}{16}''$ increments for drawing a circle about the center 15 for producing circles which vary in diameter $\frac{1}{8}''$ from each other. A scale 23 locates the apertures of an adjacent row in $\frac{1}{2}''$ increments, while the apertures of all of the rows locate the point of the pencil in increments of $\frac{1}{16}''$.

The semicircular edge 14 may be provided with a protractor scale 24 having apertures 25 for receiving the point of a pencil for accurately locating specific points such as zero, thirty, forty-five, sixty, and ninety degrees. A linear scale 26 is provided along the edge 11 of the scale 10. A plurality of apertures 27 extend through the body portion of the scale 10 and are of such size that a point of a pencil will produce circles of diameters from $\frac{1}{8}''$ up to $\frac{1}{2}''$, in $\frac{1}{16}''$ increments.

It will be noted that the circles produced by rotating the scale about the center 15 begin with a radius of $\frac{1}{16}''$ so that a $\frac{5}{8}''$ circle is the smallest circle may be drawn by rotating a point about the center 15. With the present scale circles from $\frac{1}{8}''$ to 6'' in diameter in $\frac{1}{16}''$ increments may be produced.

In Figs. 3, 4 and 5, a further form of the invention is illustrated, that wherein an aperture 30 is formed about the center 15 in which a hub 31 is mounted, as illustrated more specifically in Fig. 5. The hub has three spaced arms 32 in the nature of spokes by which it is secured to the wall of the aperture in which it is secured. The space between the arms is open to permit the operator to view the point 33 of the centering pin 34 when applying the point to a surface.

The centering pin 34 is retained on the center line of the hub by a collar 35 secured thereto above the point 33. A spring 36, mounted above the hub about the pin 34, engages the button 37 on the end of the pin and urges the pin upwardly above the surface on which the scale rests. When the scale is to be employed, it is shifted upon a surface until the point 33 is accurately located above the point on the surface. The button 37 is then pressed downwardly to secure the pin in position, after which the scale 10 may be revolved about the pin to generate the circle in the manner above pointed out in relation to the scale illustrated in Figs. 1 and 2.

In Figs. 6, 7 and 8, a further form of the invention is illustrated, that wherein the scale 40 is provided with a tab 16 and centering pin 19. The scale 40 has a slot 41 in the portion 42 thereof which is offset upwardly to provide a longitudinal recess 43. The under face of the material of the recess 43 may be provided with serrations 44, as illustrated in Fig. 8. A slide 45 is also provided with serrations which mate with the serrations 44, as illustrated in Fig. 8, and which are clamped together by a thumb nut 46 operating on a stud 47 secured to the slide 45 which extends through the slot 41. Scale reading 48 are provided on the surface of the scale 40 having each unit thereof aligned with one of the serrations 44 which thereby accurately locates the slide relative to the scale readings. The slide 45 contains an aperture 49 for receiving the end of a pencil after the slide has been adjusted to locate the aperture adjacent to the selected scale reading. In other words, the aperture 49 is aligned with the scale reading which conforms to the radius of the circle to be drawn. The thumb screw 46 is then tightened on the stud 47 to securely clamp the slide in position, with the aperture 49 accurately disposed relative to the centering element to conform accurately to the radius of the circle to be drawn. The plurality of rows of apertures 21 are eliminated when the recess 41 and slide 45 are employed. In any of the constructions, an engineering or protractor scale is illustrated wherein the centering point for the circles to be drawn may be accurately located and be securely maintained in position by downward pressure applied thereto. The pencil point is accurately located in an aperture conforming to the radius of the circle to be drawn, after which the scale and pencil are revolved about the centering element to accurately produce the circle desired.

Referring to Figs. 9 to 10, a further form of the device is illustrated, that wherein the scale 10 has an aperture 51 therein in which a button 52 is snapped and retained within a groove 53 in the button. The scale engages the groove 53 in such manner that when the button is held the scale 10 may be revolved thereabout. The button is made of transparent material having a convex surface and a flat face on the latter of which a plurality of concentric rings 54 are disposed in the nature of a reticle by which the center of the button and scale may be accurately located. The convex or semispherical surface of the button magnifies the distortion produced to the lines through the center on the surface as the button is moved back and forth thereacross. No shifting of the lines is observed when the centers coincide but any deviation therefrom results in a magnified shifting of the lines up and down or to the right and left, depending upon the direction of movement of the button and scale.

While it was indicated hereinabove that the apertures 21 and serrations 44 are spaced $\frac{1}{16}''$ apart to produce circles differing $\frac{1}{8}''$ in diameter, it is to be understood that $\frac{1}{32}''$ or other spacing may be employed to produce circles varyfrom each other an amount more or less than the $\frac{1}{8}''$ dimension referred to. The thumb nut 46 alone may be relied upon without the use of the serrated surfaces for retaining the slide 45 in adjusted position; or the thumb nut may be eliminated and the serrated surfaces depended upon for retaining the slide in adjusted position when the instrument is resting upon a surface. The apertures 25 on the protractor scale are located inwardly from the edge, as illustrated in the figures, but it is within the purview of the invention to have them disposed as notches extending to the edges so that a pencil point may be moved inwardly therein from the edge to locate the angle.

What is claimed is:

A drawing instrument embodying an elongated element having an aperture and a semi-circular end which is scaled to provide a 180° protractor scribed from the center of the aperture, a locating button comprising a generally convex transparent lens having a reticle thereon and having a peripheral groove receiving the wall of the aperture, with the bottom portion of the button projecting beyond the element and the button supported in the aperture in a manner which permits relative rotation with the element, said element having in the portion remote from said protractor additional apertures provided therethrough in predetermined spaced relation to each other and to the center of said button from which circles may be scribed about the center aligned with the center of the button by the use of a lens and reticle portions thereof.

WILLIAM F. KLEMM.

REFERENCES CITED

The following references are of record in the file of this patent:

UNITED STATES PATENTS

| Number | Name | Date |
|---|---|---|
| 392,143 | Wright | Oct. 30, 1888 |
| 738,130 | Waymire | Sept. 1, 1903 |
| 776,897 | Ferris | Dec. 6, 1904 |
| 844,157 | Loughborough | Feb. 12, 1907 |
| 1,154,673 | Van Ness | Sept. 28, 1915 |
| 1,307,233 | Bernard | June 17, 1919 |
| 1,498,870 | Fox | June 24, 1924 |
| 1,808,705 | Owen | June 2, 1931 |
| 1,933,880 | Tihenko | Nov. 7, 1933 |

FOREIGN PATENTS

| Number | Country | Date |
|---|---|---|
| 687,018 | Germany | Feb. 20, 1940 |